Aug. 14, 1956  A. G. BUHR  2,758,555
TRACTOR PLANTER
Filed Jan. 18, 1952  4 Sheets-Sheet 1

Inventor
August G. Buhr
by W. Jerold?
Attorneys

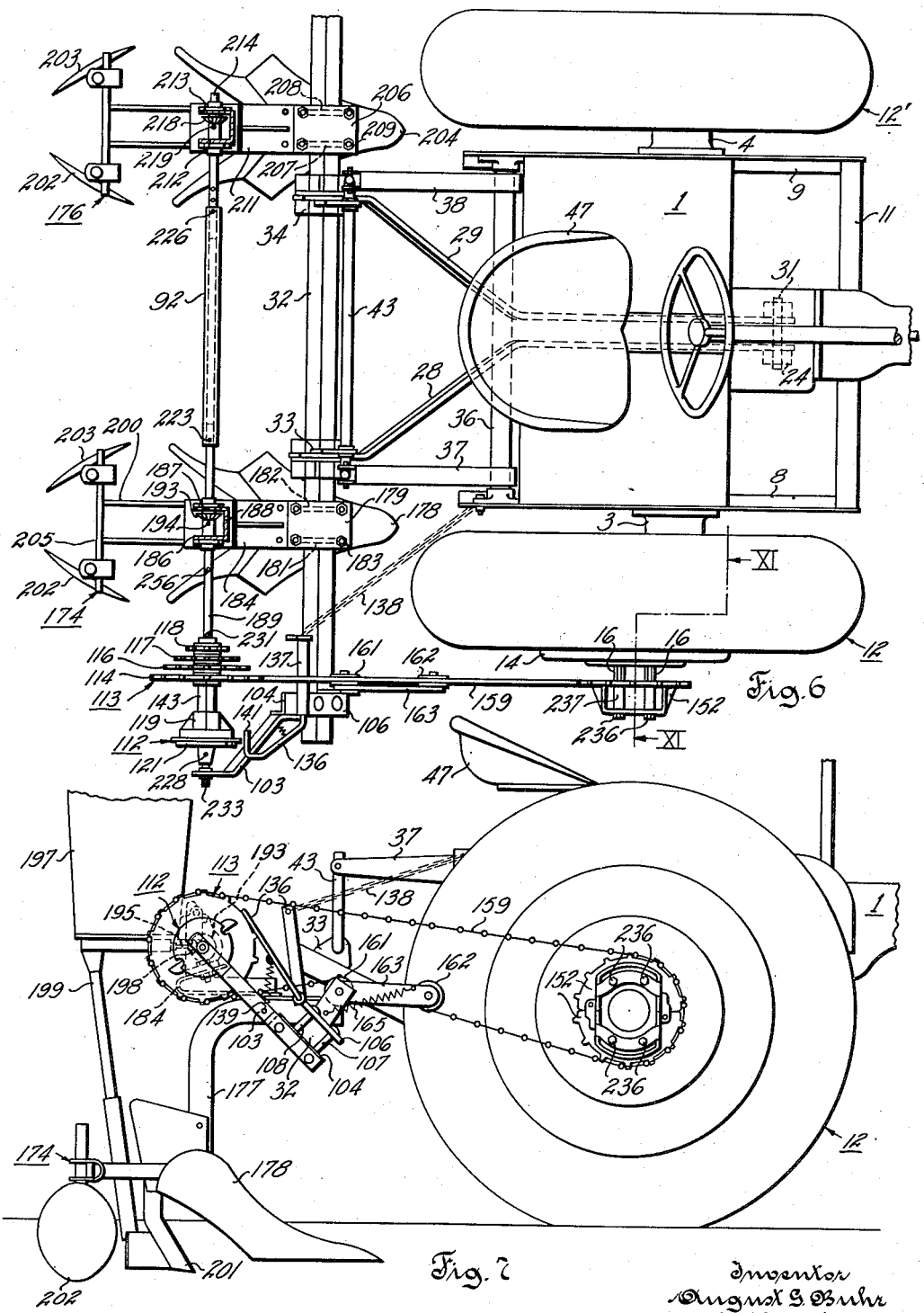

Aug. 14, 1956  A. G. BUHR  2,758,555
TRACTOR PLANTER
Filed Jan. 18, 1952  4 Sheets-Sheet 4
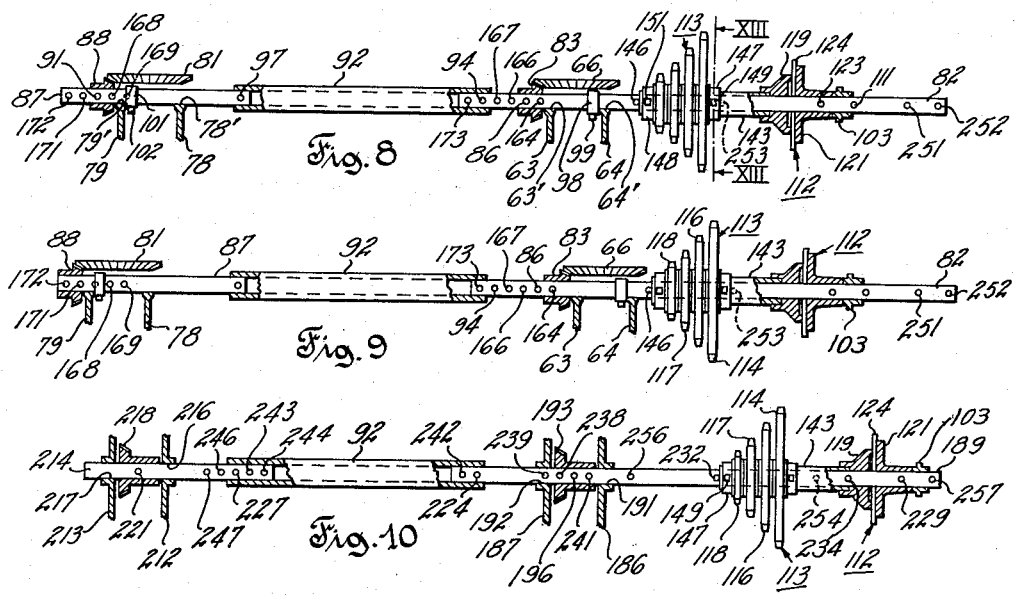
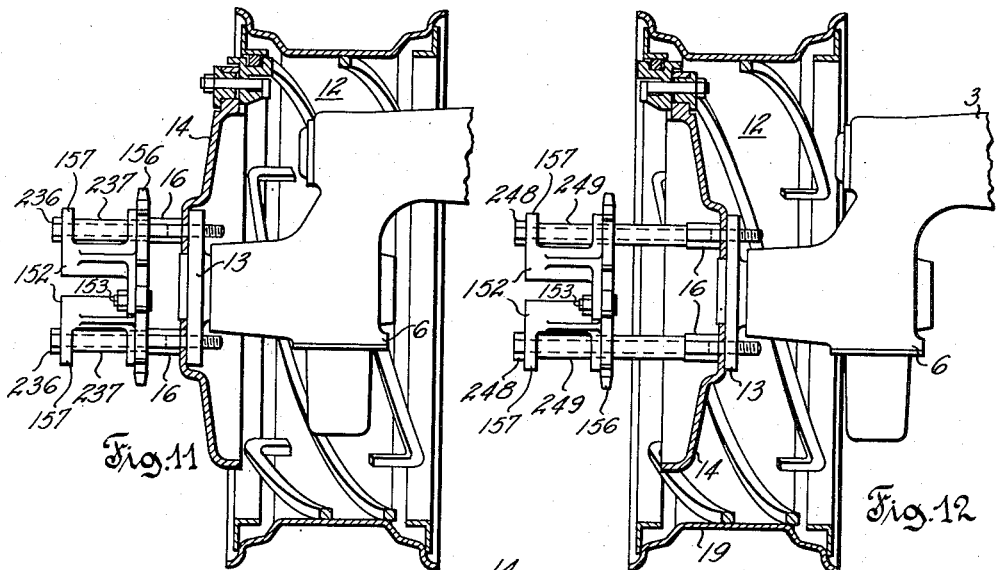
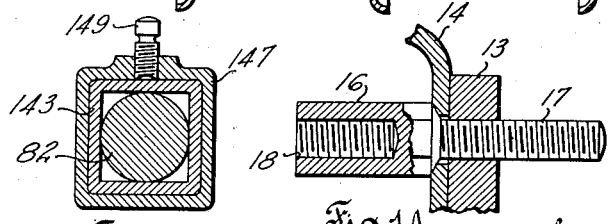

United States Patent Office 2,758,555
Patented Aug. 14, 1956

2,758,555

TRACTOR PLANTER

August G. Buhr, La Crosse, Wis., assignor to Allis-Chalmers Manufacturing Company, Milwaukee, Wis.

Application January 18, 1952, Serial No. 267,130

12 Claims. (Cl. 111—69)

The invention relates to seed planters, and it is concerned more particularly with a tractor operated multiple-row planter which may be used for planting seeds either in the furrows or on the ridges of listed land, or on flat land which presents a prepared seed bed substantially without furrows and ridges.

Various types of planter attachments for tractors have heretofore been suggested and are widely used for planting row crops according to any one of the three mentioned methods. In order to plant in the furrows, the tractor is commonly equipped with two or more lister plow bottoms and also with a corresponding number of planting units which deposit and cover the seeds immediately in back of the lister bottoms. In this way the seed bed is prepared and the seed is planted in one operation, instead of the three to five operations required according to other methods.

When it is desired to plant the seeds on the ridges of previously listed land, the planting units on the tractor are positioned at a transverse spacing from each other which corresponds to the spacing between the centers of adjacent ridges, and the right and left propelling wheels of the tractor are preferably so positioned that they run in the furrows between relatively adjacent ridges at opposite sides, respectively, of the tractor. If the tractor is of the well known tricycle type, the tread spacing of the rear wheels may be such that they run in furrows at the right and left, respectively, of a central furrow, and the tractor will be equipped with at least two planting units which are so arranged that one will plant on the ridge at the right of the central furrow, and the other on the ridge at the left of the central furrow.

The mentioned tread spacing of the tractor wheels which is desirable for planting on the ridges is also desirable for flat land planting because in the latter case one of the wheel tracks may be used as a guide during back tracking, as is well known in the art. Generally, the tread spacing which is desirable for planting on the ridges and on flat land is relatively wide, say 72 inches or more.

For lister planting, on the other hand, that is for planting in the furrows, a relatively wide tread spacing such as is desirable for ridge planting and flat land planting would usually not be satisfactory for reasons which are well known in the art, and a relatively narrow tread spacing such as 52 inches, for example, is ordinarily used for lister planting. In order to take care of the different tread spacings which are required for the different planting methods and for various row spacings, it is desirable that the tractor be equipped with wheels which can be adjusted to different tread spacings.

Another requirement for a tractor operated multiple-row planter of the type outlined hereinbefore is that the planting units be adjustable transversely of the tractor for different row spacings. Also, the speed at which the seed feeding mechanisms of the planting units are driven at any given tractor speed should be variable so that individual seed kernels, or a number of bunched seed kernels, can be deposited at predetermined spacings from each other. It is also desirable to provide for automatic control of the seed feeding mechanisms so that they will be inoperative and no seed will be lost when the tractor is moved with the planting units in raised position, as in driving to and from the field or during turning at the head lands.

Generally, it is an object of the invention to provide an improved tractor operated multiple-row planter, and one which will take care of the various hereinabove outlined requirements in a practical and fully satisfactory manner.

More specifically, it is an object of the invention to provide an improved power transmitting mechanism for supplying the seed feeding mechanism of a tractor planter with driving power, the improved power transmitting mechanism as contemplated by the invention being of the chain and sprocket type and having a driving sprocket which is rotatable in unison with one of the tractor propelling wheels.

A further object of the invention is to provide a chain and sprocket type drive mechanism of the hereinabove outlined character which lends itself for use on tractors in which the tread spacing of the propelling wheels may be changed by reversing the wheels on their respective driving axles, and in which, for purposes of further tread adjustment, the rims of the reversible wheels may be axially adjustable relative to the wheel bodies.

A further object of the invention is to provide a chain and sprocket type drive mechanism of the hereinabove outlined character which may readily be adjusted to afford different speed ratios between the driving sprocket which rotates in unison with one of the tractor wheels, and a driven shaft which operates the seed feeding mechanisms.

A further object of the invention is to provide, in a tractor planter of the hereinabove outlined character, an improved mechanism for automatically starting and stopping operation of the seed feeding mechanisms.

A still further object of the invention is to provide an improved multiple-row planter attachment for tractors, whose individual components can readily be assembled and disassembled which may readily be adapted to the planting of a large variety of crops; and which may readily be adjusted to take care of various requirements as to row and seed spacings of the individual crops.

The foregoing and other objects and advantages are attained by the present invention various novel features of which will be apparent from the description herein and the accompanying drawings disclosing two embodiments of the invention, and will be more particularly pointed out in the appended claims.

In the drawings:

Fig. 6 is a top view of a tractor operated two-row planter similar to Fig. 1, the planter as shown in Fig. 6 being set up for planting seed in the furrows of listed land;

Fig. 7 is a side view of the planter shown in Fig. 6;

Fig. 8 is a partial, somewhat schematic view of the seed feeding mechanism of the planter shown in Fig. 1;

Fig. 9 is a view similar to Fig. 8 but showing parts in a different condition of relative adjustment;

Fig. 10 is a partial, somewhat schematic view of the seed feeding mechanism of the planter shown in Fig. 6;

Fig. 11 is a detail view, partly in section, on line XI—XI of Fig. 6, the tire being omitted;

Fig. 12 is a view similar to Fig. 4 but showing parts in a different condition of relative adjustment, the tire being omitted;

Fig. 13 is an enlarged sectional view on line XIII—XIII of Fig. 8; and

Fig. 14 is an enlarged detail view, partly in section, of a socket stud and associated parts shown in Fig. 4.

Figures 1, 2:
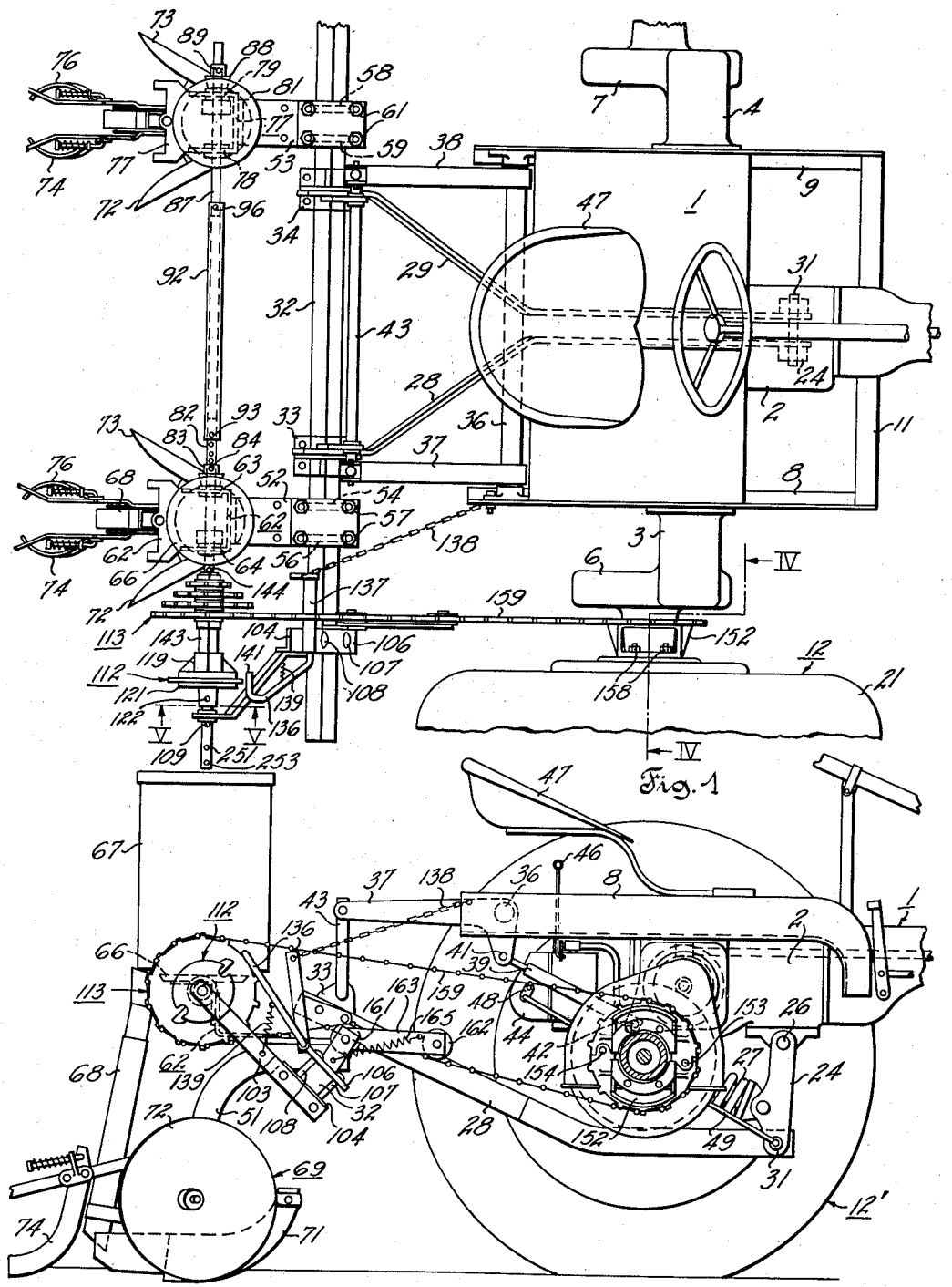
Fig. 1 is a fragmentary top view of a tractor operated two-row planter set up for planting seed on the ridges of previously listed land or on flat land.
Fig. 2 is a side view of the planter shown in Fig. 1, the near rear wheel of the tractor being omitted for purposes of clarity.
Figure 3:
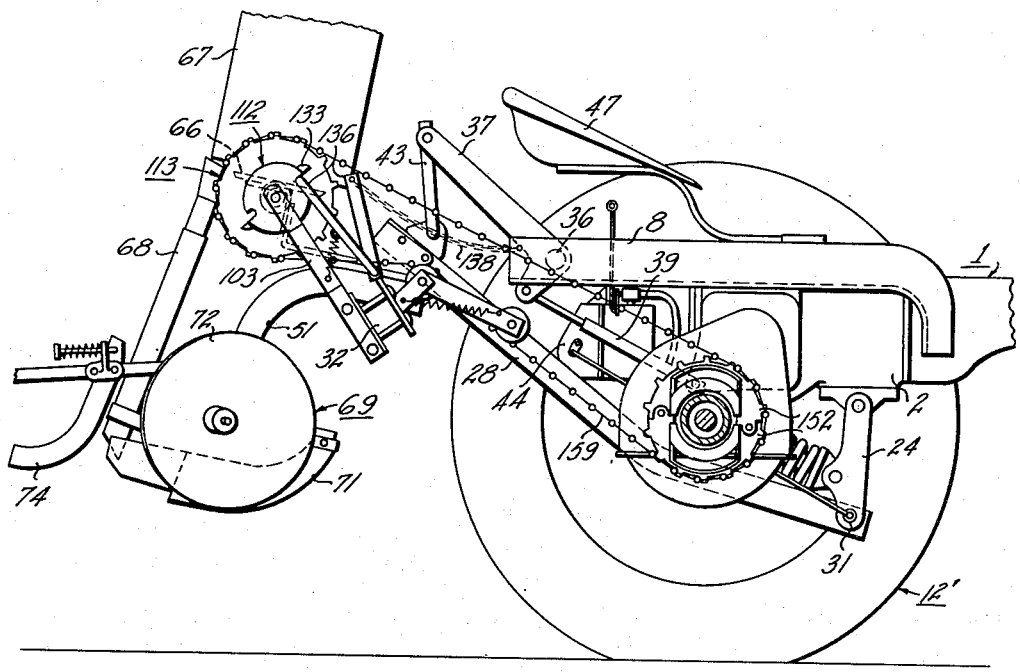
Fig. 3 is a side view similar to Fig. 2 but showing the planter attachment in a raised position.

The tractor planter shown in Figs. 1, 2 and 3 comprises three principal components, namely a tractor component, an implement component, and a hydraulically operated mechanism for raising and lowering the implement component relative to the tractor component.

The tractor component, in the illustrated embodiment of the invention, consists of a tricycle type tractor of conventional construction, only a rear part of such tractor being shown and generally designated by the reference character 1. The body structure of the tractor includes a transmission housing 2, transversely extending side arms 3 and 4 of a rear axle housing, depending final drive housings 6 and 7 at the axially outer ends, respectively, of the side arms 3 and 4, and a stationary frame work comprising side members 8 and 9 and a cross member 11. The rear axle structure comprising the side arms 3 and 4 and the final drive housing 6 and 7 is supported on a pair of propelling wheels only one of which is shown in Fig. 1 and generally designated by the reference character 12. The rear wheel 12 at the right side of the tractor, and the corresponding rear wheel 12′ at the left side, shown in Fig. 2, are of a type permitting variation of the tread spacing between said wheels, and the following explanations regarding the construction and mounting of the wheel 12 at the right side of the tractor similarly apply to the other rear wheel 12′.

Figure 4:
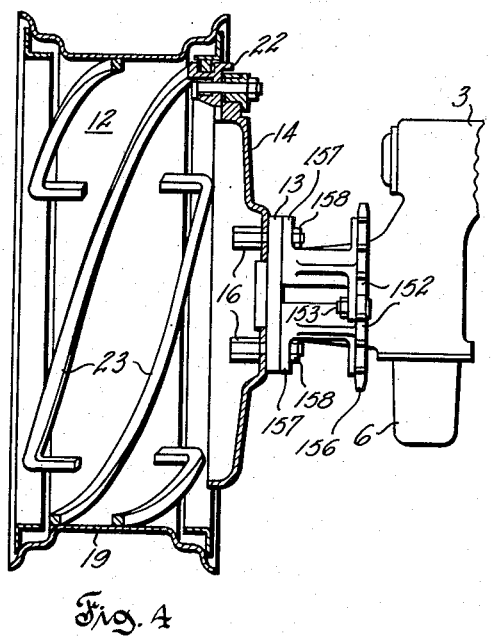
Fig. 4 is a detail view, partly in section, on line IV—IV of Fig. 1, the tire being omitted.

Referring to Fig. 4, the depending final drive housing 6 mounts a rotatable, power driven axle part which has a radial flange 13, and detachably and reversibly secured to the flange 13, at the axially outer side of the latter, is a dished disk member 14. The flange 13 has a circumferential series of tapped holes, and the disk 14 is drawn up axially against the flange 13 by a series of socket studs 16 which have externally threaded shanks, respectively, in cooperative engagement with internal threads of the tapped holes of the flange 13, as more clearly shown in Fig. 14. In addition to the socket studs 16, cap screws, not shown, may be provided to secure the disk 14 in axially fixed, nonrotatable relation to the flange 13.

Fig. 14 shows an enlarged view, partly in section, of one of the stud bolts 16, and of adjacent portions of the flange 13 and disk member 14. As shown in this figure, the externally threaded shank 17 of the bolt 16 is relatively long so as to project a substantial distance from the axially inner side of the flange 13, and the head of the bolt 16 is counterbored and internally threaded to provide a tapped recess 18 for a purpose which will appear more fully hereinbelow. The external threads of shank 17 cooperate with internal threads of the flange 13 to hold the parts in assembled condition as shown in Fig. 14 without the aid of a nut on the shank 17.

Referring again to Fig. 4, the disk member 14 forms a radially inner part of the traction wheel 12, and a radial outer part of that wheel comprises a tire rim 19 and a pneumatic tire 21 indicated in Fig. 1 and omitted in Fig. 4. The disk 14 is equipped at its periphery with a circumferential series of runners, one of which is indicated in Fig. 4 by the reference character 22, and the rim 19 is equipped with a series of parallel spiral rails 23 in cooperative engagement, respectively, with the runners on the disk 14. Figs. 1 and 4 show the radially outer part of the traction wheel 12 in its maximum tread position, and Fig. 12 shows the outer part of the wheel 12 in a narrowed tread position to which it may be shifted by rotation of the disk member 14 relative to the rim 19, in accordance with well known principles, as disclosed for instance in U. S. Patent 2,417,139 granted March 11, 1947, to Walter F. Strehlow for Variable Wheel Tread Vehicle.

In order to reverse the disk 14 on the flange 13, the tractor body is jacked up so as to raise the wheel 12 from the ground, and after the stud bolts 16 and any aditional cap screws, if used, have been removed, the disk 14 may be withdrawn from the flange and reinstalled in reverse position as shown in Fig. 11. As illustrated by Figs. 4 and 11, the dished radially inner part 14 of the wheel 12 is reversibly and coaxially fixed to a rotating part 13 of the tractor rear axle structure to selectively present a convex side of said inner wheel part in either inwardly or outwardly facing relation to the body structure of the tractor.

When the disk 14 is mounted on the flange 13 with the convex side of the disk facing inwardly, the radially outer part of the wheel 12 may be adjusted to a narrower tread position than that in which it is shown in Fig. 4. Fig. 12 shows the radially outer part of the wheel 12 in the minimum tread position to which it may be adjusted when the disk is mounted on the flange 13 with the concave side of the disk facing outwardly.

The implement component of the tractor planter, as shown in Figs. 1 and 2, comprises a draft structure and a pair of transversely spaced planter units and associated parts mounted on the draft structure. As shown in Fig. 2, a link 24 is mounted at the under side of the transmission housing 2 on a pivot pin 26, and a coil spring 27 is operatively interposed between the link 24 and the body structure of the tractor so as to yieldingly resist rearward swinging movement of the link 24 on the pivot pin 26. The draft structure of the implement component comprises a pair of forwardly converging draft bars 28 and 29, which extend forwardly under the rear axle structure of the tractor and are pivotally connected at their forward ends to the lower end of the link 24 by means of a pivot pin 31. The rear ends of the draft bars 28 and 29 are rigidly connected with a tool bar 32 which extends transversely of the tractor in rear of the traction wheels. The tool bar 32 is preferably solid and of square cross section, and suitable fittings 33 and 34 at the rear ends of the draft bars 28 and 29 are nonrotatably mounted on the tool bar 32 in axially fixed positions, and rigidly connected with the draft bars 28 and 29.

The hydraulically operated mechanism for raising and lowering the implement component relative to the tractor component comprises a rock shaft 36 which is rotatably mounted at its opposite ends on the side members 8 and 9 of the tractor as shown in Fig. 1, and which mounts a pair of lift levers 37 and 38. As shown in Fig. 2, the lift lever 37 has a relatively long lift arm which in the lowered position of the planter extends rearwardly from the rock shaft 36, and a relatively short actuating arm which extends downwardly from the rock shaft 36, as shown in Fig. 2. A hydraulic jack 39 is operatively interposed between the actuating arm of the lift lever 37 and the rear axle structure of the tractor, as indicated in Fig. 2, the piston rod of the jack 39 being pivoted to the lift lever 37 by a pin 41 and the cylinder of the jack 39 being pivoted to a housing portion of the rear axle structure by a pivot pin 42. The lift lever 38 at the left side of the tractor is a duplicate of the lift lever 37 and another hydraulic jack, not shown, corresponding to the jack 39 may be operatively interposed between the lift lever 38 and the rear axle structure of the tractor. Rotatably mounted on the fittings 33 and 34 is a bail 43, the opposite arms of which extend upwardly from the fittings 33 and 34, respectively, and are pivotally connected at their upper ends with the lift levers 37 and 38, respectively.

Fig. 2 shows the hydraulic jack 39 in a contracted condition and upon admission of pressure fluid to the jack 39 and to the corresponding jack at the other side of the tractor, if used, the draft frame comprising the side bars 28 and 29 and the tool bar 32 will be swung upwardly on the pivot pin 31, as illustrated in Fig. 3.

A hydraulic power supply system comprises a pump 44 which is mounted on the tractor and driven by the tractor motor, through suitable mechanism not shown. A hand lever for manual control of the hydraulic system is indicated in Fig. 2 at 46 and mounted on the tractor within reach of an operator on a seat 47. The tractor is also equipped with an automatic draft regulating apparatus in conformity with established principles as disclosed for instance in U. S. Patent No. 2,611,245, issued September 23, 1952, to Walter F. Strehlow for Pump And Motor Hydraulic System And Regulating Apparatus Therefor.

The automatic draft regulating apparatus includes a control lever 48 shown in Fig. 2, and a link 49 which connects the lever 48 with the link 24.

A tool standard 51, shown in Fig. 2, is rigidly secured to the tool bar 32 at the laterally outer side of the fitting 33, as shown in Fig. 1, and another tool standard, not shown, is similarly secured to the tool bar 32 at the laterally outer side of the fitting 34. A hopper attaching structure of the right planter unit comprises a bracket plate 52 which is fixedly secured to the upper end of the tool standard 51 and adapted for selective adjustment therewith longitudinally of the tool bar 32. A hopper attaching structure of the left planter unit at the laterally outer side of the fitting 34 comprises another bracket plate 53 which is fixedly secured to the upper end of the tool beam of the left planter unit and adapted for selective adjustment therewith longitudinally of the tool bar 32. A pair of U-bolts 54 and 56, as indicated in Fig. 1, are looped around the tool bar 32 from below and extend upwardly through the bracket plate 52 for establishing a releasable connection between the hopper attaching structure of the right planter unit and the tool bar 32. The U-bolts 54 and 56 are provided with nuts 57 on the upper side of the bracket plate 52 so that the latter and parts associated therewith may be secured in axially fixed and nonrotatable relation to the tool bar 32 by tightening of the nuts 57, and so that the bracket plate 52 and associated parts may be released for adjustment longitudinally of the tool bar 32 by loosening of the nuts 57. The bracket plate 53 is secured to the tool bar 32 by means of a pair of U-bolts 58 and 59 which correspond to the U-bolts 54 and 56 and which carry nuts 61 at the upper side of the bracket plate 53.

Secured to the bracket plate 52 and extending rearwardly therefrom is a hopper mounting base 62 of conventional construction. The base 62 presents a pair of laterally spaced vertical wall portions 63 and 64 as shown in Fig. 1. Rotatably mounted on the base 62 is a conventional seed feeding mechanism including a ring gear 66 which has a circumferential series of bevel teeth at its lower side. Also mounted on the base 62, in conventional manner, are a seed hopper 67 and a seed delivery tube 68.

At the lower end of the beam 51, as shown in Fig. 2, a ground rig 69 is mounted in conventional manner and comprises a runner type furrow opener 71, furrow opening disks 72 and 73 and covering knives 74 and 76. In addition to the covering knives, the rig 69 may include a pair of trailing press wheels, not shown, in conformity with conventional practice.

The left hand planter unit, which is shown in the upper left hand part of Fig. 1, is a duplicate of the right hand planter unit which has just been described. It comprises a hopper mounting base 77 which presents a pair of transversely spaced wall portions 78 and 79, a seed can hopper, not shown, and a ground rig, corresponding to the seed hopper 67 and ground rig 69 of the right hand planter unit. A ring gear 81 of the left hand planter unit corresponds to the ring gear 66 of the right hand planter unit and has a circumferential series of bevel teeth at its lower side.

A rotatable seeder shaft section 82 is disposed in generally parallel relation to the tool bar 32 and supported for selective longitudinal adjustment relative to the hopper mounting base 62 and for movement therewith relative to the tool bar 32. As shown in Figs. 1 and 8, the laterally spaced wall portions 63 and 64 of the hopper mounting base 62 have shaft receiving openings 63' and 64', respectively, aligned on an axis extending generally parallel to the tool bar 32, and the seeder shaft section 82 extends through and is journaled in the shaft receiving openings of the wall portions 63 and 64. A bevel pinion 83 is mounted on the seeder shaft section 82 at the left side of the wall portion 63 and meshes with the ring gear 66 of the right planter unit. A cotter pin 84 (Fig. 1) passes through a hub portion of the bevel pinion 83 and through a hole 86 (Fig. 8) in the seeder shaft section 82 for securing the bevel pinion 83 in axially fixed position on the seeder section 82.

Another rotatable seeder shaft section 87 is disposed generally in axial alignment with the seeder shaft section 82 and supported for selective longitudinal adjustment relative to the hopper mounting base 77. The wall portions 78 and 79 of the hopper mounting base 77 have shaft receiving openings 78' and 79', respectively, therethrough in axial alignment with the shaft receiving openings of the wall portions 63 and 64, and the seeder shaft section 87 extends through and is journaled in the shaft receiving openings of the wall portions 78 and 79. A bevel pinion 88 is mounted on the seeder shaft section 87 at the left side of the wall portion 79 and meshes with the ring gear 81 of the left planter unit. A cotter pin 89 (Fig. 1) passes through a hub portion of the bevel pinion 88 and through a hole 91 (Fig. 8) in the seeder shaft section 87 for securing the bevel pinion 88 in axially fixed position on the seeder shaft section 87.

A coupling shaft section 92 connects the seeder shaft sections 82 and 87 in axially adjustable, power transmitting relation with each other. As best shown in Fig. 8, the coupling shaft section 92 is tubular and telescopically engaged at its opposite ends with the adjacent ends, respectively, of the seeder shaft sections 82 and 87. In the adjusted condition of the parts, as shown in Fig. 8, the coupling shaft section 92 and the right seeder shaft section 82 are nonrotatably connected in axially fixed relation to each other by a cotter pin 93 (Fig. 1) which passes through a hole 94 (Fig. 8) in the seeder shaft section 82 and through a registering pair of holes at the right end of the coupling shaft section 92. The left seeder shaft section 87 and the coupling shaft section 92, in the condition of the parts as shown in Fig. 8, are nonrotatably connected in axially fixed relation to each other by a cotter pin 96 (Fig. 1) which passes through a hole 97 (Fig. 8) and a registering pair of holes in the left end of the coupling shaft section 92.

As further shown in Fig. 8, a positioning collar 98 is mounted on the seeder shaft section 82 at the left side of the wall portion 64, and is retained in axially fixed position on the seeder shaft section 82 by means of a set screw 99. Another positioning collar 101 is mounted on the seeder shaft section 87 at the right side of the wall portion 79, and is retained in axially fixed position on the seeder shaft section 87 by means of set screw 102. The relative axial spacing of the positioning collars 98 and 101 in the condition of the parts as shown in Fig. 8 is such that the bevel pinions 83 and 88 will be prevented from meshing too deeply with their mating ring gears 66 and 81, respectively, by axial engagement of the positioning collar 98 with the side wall 64, and so that the bevel pinions 83 and 88 will be prevented from meshing too shallow with their mating ring gears 66 and 81, respectively, by axial engagement of the positioning collar 101 with the side wall portion 79.

The seeder shaft section 82 extends a substantial distance to the right of the right planter unit and is additionally supported on a bracket arm 103, as shown in Fig. 2. The bracket arm 103 is secured to an angular support 104, and a plate 106 and bolts 107 and 108 are provided to clamp the angular support 104 upon the tool bar 32. The bolts 107 and 108 are drawn up to secure the support 104 and bracket arm 103 in fixed relation to the tool bar 32, and the bolts 107 and 108 may be loosened to permit adjustment of the support 104 and bracket arm 103 to different positions longitudinally of the tool bar 32 for a purpose which will appear more fully hereinbelow.

Figure 5:
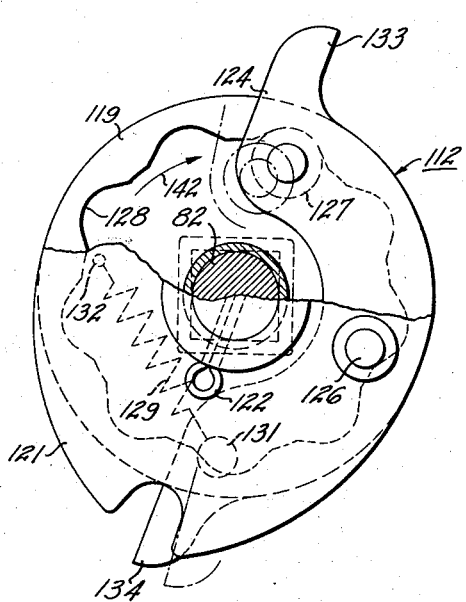
Fig. 5 is an enlarged side view of a clutch unit incorporated in the planter shown in Figs. 1 and 2, Fig. 5 being a view on line V—V of Fig. 1 and parts being broken away for purposes of clarity.

In the adjusted condition of the parts as shown in Figs. 1 and 8, the seeder shaft section 82 extends a substantial distance axially outward beyond the bracket 103. A cotter pin 109 (Fig. 1) is mounted in a hole 111 (Fig. 8) of the seeder shaft section 82 at the axially outer side of the bracket 103. Operatively mounted on the seeder shaft section 82 at the axially inner side of the bracket 103 are a throwout clutch, generally indicated by the reference character 112, and a gear cluster 113 comprising four sprocket gear sections 114, 116, 117 and 118 of different pitch diameters. The throwout clutch 112 is shown in detail in Fig. 5, and comprises an internally scalloped driving section 119 in rotatively loose relation to the seeder shaft section 82, a driven section 121 which is releasably secured in nonrotatable and axially fixed relation to the seeder shaft section 82 by a cotter pin 122 (Fig. 1). The cotter pin 122 passes through a hub portion of the driven clutch section 121 and through a hole 123 (Fig. 8) in the seeder shaft section 82. A rocker 124 (Fig. 5) is operatively interposed between the driving and driven sections of the throwout clutch 112 and operable selectively to either establish or interrupt a power transmitting connection between the clutch sections. The rocker 124 is pivotally mounted, as shown in Fig. 5, on the driven clutch section 121 by means of a pivot pin 126 in eccentric relation to the seeder shaft section 82. A cylindrical lug 127 is rigidly secured to the rocker 124 and adapted to move into and out of cooperative engagement with internal corrugations 128 of the driving clutch section 119 upon back and forth swinging movement of the rocker 124 on the center of pivot pin 126. A coil spring 129 is hooked at one end into a hole 131 of the rocker 124 and at its other end on a pin 132 which is mounted in the driven clutch section 121. The spring 129 is normally effective to urge the cylindrical lug 127 into torque transmitting engagement with the driving section 119, as shown in Fig. 5. The rocker 124 has diametrically opposed fingers 133 and 134 which extend radially outward from the driving and driven sections of the clutch 112 and by means of which the rocker may be moved to a clutch disengaging position, as will be described more fully hereinbelow.

A clutch control lever 136 is rockably mounted in a sleeve part 137 which is rigidly secured, as by welding, to the plate 106 and extends longitudinally of the tool bar 32. The clutch control lever 136 has two arms, one at the axially inner side of the sleeve 137 which is connected by a chain 138 with the side bar 8 of the tractor body, and another at the axially outer end of the sleeve 137 for cooperative engagement with one or the other of the fingers 133 and 134 of the rocker 124. In the condition of the parts as shown in Figs. 1 and 2, the chain 138 is held taut by a spring 139 which is operatively interposed between the clutch control lever 136 and the bracket 103. As shown in Fig. 1, the arm of the clutch control lever 136 at the axially outer end of the sleeve 137 has an end portion 141 which is bent so as to extend generally parallel to the seeder shaft section 82 and in radially opposed relation to the throwout clutch 112. In the condition of the parts as shown in Figs. 1 and 2, that is, while the chain 138 is kept taut by the spring 139, the end portion 141 of the clutch control lever 136 is radially spaced from the clutch 112 so that the rocker 124 may be kept by the spring 129 in the clutch engaged position in which it is shown in Fig. 5, without interference of the fingers 133, 134 with the end portion 141 of the clutch control lever 136. Upward movement of the tool bar 32 to a raised position as shown in Fig. 3 causes the chain 138 to slacken, and as a result, the end portion 141 of the clutch control lever 136 will ride on the periphery of the driven clutch member 121. During forward movement of the tractor, the driven member 121 of the clutch is rotated in the direction of arrow 142 in Fig. 5, as will be explained more fully hereinbelow, and when one or the other of the fingers 133 and 134 of the rocker 124 moves into engagement with the end portion 141 of the clutch control lever 136, the cylindrical lug 127 will be moved to the dash-dotted position indicated in Fig. 5, with the result that the driven section 121 of the clutch will come to rest while the driving section 119 may continue to rotate relative to the then stationary seeder shaft section 82. The effective length of the chain 138 may be increased or decreased in order to interrupt the seeder shaft drive relatively early or relatively late upon upward movement of the tool bar 32 from its lowered working position.

The sprocket gears 114, 116, 117 and 118 of the gear cluster 113 are aligned on and axially shiftable as a unit relative to a square tube member 143 which is rigidly secured to the driving section 119 of the clutch 112 and rotatably supported on the seeder shaft section 82. A cotter pin 144 (Fig. 1) is mounted in a hole 146 (Fig. 8) of the seeder shaft section 82 at the axially inner end of the square tube 143 in axial abutting engagement with the latter so as to secure the tube 143 and driving clutch member 119 against axial inward movement relative to the seeder shaft section 82. Axial outward movement of the clutch section 119 and tube 143 is limited by the driven clutch section 121 which, as stated, is secured to the seeder shaft section 82 by the cotter pin 122. A collar 147 is mounted on the tube 143 at the axially outer side of the gear cluster 113, and a similar collar 148 is mounted on the tube 143 at the axially inner side of the gear cluster 113. The collars 147 and 148, like the gears of the cluster 113, have square apertures loosely fitting upon the tube 143 so as to permit axial sliding movement, but prevent rotary movement of the gears and collars relative to the tube 143. The collar 147 has a set screw 149 (Fig. 1), and the collar 148 has a similar set screw 151 (Fig. 8) for securing the gear cluster 113 and collars in axially fixed relation to the tube 143.

A drive sprocket 152, as shown in Figs. 1, 2 and 4, is secured to the flange 13 of the drive axle for the wheel 12 at the axially inner side of the disk 14. The drive sprocket 152 is made in two diametrically opposed sections which are detachably connected with each other by bolts 153 and 154, as shown in Fig. 2. The drive sprocket 152 has an annular series of driving teeth 156, and two complementary flange sections 157 in axially offset relation to the teeth 156. The complementary flange sections 157, in the assembled condition of the drive sprocket, present a circumferential series of unthreaded holes which are relatively spaced in conformity with the circumferential spacing of the stud bolts 16. The threaded shanks of the stud bolts 16 extend through the unthreaded holes of the flange sections 157 of the drive sprocket 152, and as best shown in Fig. 4, nuts 158 are drawn up on the threaded shanks 17 into engagement with the flange sections 157 so as to secure the drive sprocket 152 in axially fixed and nonrotatable relation to flange 13 and radially inner part 14 of the adjustable tread wheel 12.

As shown in Figs. 1, 2 and 3, an endless chain 159 is trained over the toothed section of the drive sprocket 152 and over the sprocket gear section 114 of the gear cluster 113. The lower run of the chain passes over a roller 161 which is journaled on an upstanding arm secured to the plate 106 on the tool bar 32. Another roller 162 is rotatably mounted at the free end of an arm 163 which is pivotally supported at its other end coaxially with the roller 161. The roller 162 bears upon the top side of the lower run of the chain 159, and a coil spring 165 is operatively interposed between the arm 163 and the plate 106 and effective to pull the roller 162 into engagement with the chain 159, as best shown in Figs. 2 and 3.

The tractor planter as shown and described with reference to Figs. 1 and 2 is adapted for planting seeds on the ridges of previously listed land. For purposes of explanation it may be assumed that the spacing of the centers between the ridges of the previously prepared land is forty inches, and that the right and left planter units, as shown in Figs. 1 and 8, are transversely spaced from each other the same distance. It may further be assumed that the axially adjusted position in which the radially outer part of the tractor wheel 12, as shown in Figs. 1 and 4, and the corresponding axially adjusted position of the drive wheel at the other side of the tractor, not shown, afford a tread spacing of eighty inches between the tractor wheels. Under these conditions, the centrally located relatively adjacent front wheels of the tractor, not shown, may be driven in one furrow of the previously listed land while the right and left rear wheels of the tractor may run in the furrows at the right and left, respectively, of the central furrow, and the right and left planter units deposit seeds on the ridges at the right and left of the central furrow. When the tractor is turned around at the end of the field, say toward the right, the right tractor wheel will back track in the same furrow in which it has been running, before, and the front wheels and the left rear tractor wheel will run precisely in the centers of a pair of new furrows.

If the spacing between relatively adjacent ridges of the previously prepared land should be less than forty inches, the rear wheels of the tractor may be readily adjusted to the narrower tread spacing which will be required due to the narrower ridge spacing and the consequent narrower furrow spacing.

The right and left planter units may likewise be readily adjusted to a narrower spacing from each other than that at which they are shown in Figs. 1 and 8. In order to make such an adjustment of the planter units, the nuts 57 and 61 on the U-bolts 54, 56, 58 and 59 may be loosened so as to release the bracket plates 52 and 53 and associated parts for shifting longitudinally of the tool bar 32. The bracket 103 and support 104 may stay in place on the tool bar 32. However, the set screws 99 and 102, see Fig. 8, which retain the positioning collars 98 and 101 on the seeder shaft sections 82 and 87, respectively, will be loosened and the cotter pins 84 and 89, Fig. 1, which secure the bevel pinions 83 and 88, respectively, will be removed. After these preparatory steps, the right and left planter units may be moved inwardly, that is, toward each other while the entire seeder shaft assembly comprising the seeder shaft sections 82, 87 and coupling shaft section 92 remains in the axial position relative to the tool bar 32, in which it is shown in Fig. 1.

The seeder shaft section 82, as shown in Fig. 8, has one hole 164 to the right of hole 86, and two holes 166 and 167 to the left of the hole 86. Similarly, the seeder shaft section 87 has two holes 168 and 169 to the right of hole 91, and two holes 171 and 172 to the left of the hole 91. In order to adjust the right and left planter units to a narrower row spacing, the bevel pinion 83 in Fig. 8 may be moved to the left and secured in a new position by inserting the cotter pin 84 through either the hole 166 or the hole 167. Movement of the right planter unit to the left will also cause the positioning collar 98 to slide toward the left on the seeder shaft section 82, and after the right planter unit has been adjusted to the desired position the previously loosened set screw 99 of the positioning collar 98 may be tightened so as to secure the positioning collar 98 in close proximity to the side wall 64 of the hopper mounting base 62. A similar procedure will be followed for adjusting the left planter unit toward the right in Fig. 8. That is, the bevel pinion 88 may be secured in a new position by inserting the cotter pin 89 in either the hole 168 or in the hole 169, and the previously loosened set screw 102 of the positioning collar 101 may be tightened so as to secure the positioning collar 101 in close proximity to the side wall 79 of the hopper mounting base 77.

After the bevel pinions 83 and 88 and the positioning collars 98 and 101 have been adjusted inwardly to new positions, as outlined hereinbefore, the nuts on the U-bolts 54, 56, 58 and 59 may be tightened and the planter will then be ready for planting seeds at the desired narrower row spacing. It will be noted that inward adjustment of the right and left planter units in the manner described hereinbefore does not affect the axial position of the throwout clutch 112 and of the gear cluster 113 relative to the tool bar 32. Accordingly, the drive of the seed dispensing mechanisms will be automatically interrupted by cooperative engagement of the clutch control lever 136 with one of the fingers 133 and 134 of the rocker 124 when the tool bar 32 is raised to the position in which it is shown in Fig. 3, and as has been explained hereinbefore.

If it is desired to increase the speed at which the seed dispensing mechanisms are driven at any given tractor speed, this may readily be accomplished by placing any one of the driving sprockets 116, 117 and 118 into alignment with the toothed section of the driving sprocket 152, and by engaging the chain 159 with the selected sprocket section of the gear cluster 113. In order to align any one of the driven sprockets 116, 117 and 118 with the toothed section of the driving sprocket 152 the set screws 149 and 151 of the collars 147 and 148 may be loosened and the whole gear cluster 113 may be shifted as a unit toward the right in Fig. 8 into the desired position which will establish alignment of the selected driven sprocket with the driving sprocket. The set screws 149 and 151 may then be tightened again so as to secure the gear cluster 113 in the new axially adjusted position. Increased slack of the chain 159 which will result when the chain is engaged with any one of the smaller pitch diameter sprocket wheels 116, 117 and 118 may be taken care of by operation of the chain tensioning mechanism comprising the rollers 161, 162, arm 163 and springs 165 (Fig. 2), or by removing a link or links from the chain 159.

It is also possible to adjust the right and left planter units to a wider row spacing than that at which they are shown in Figs. 1 and 8. This is illustrated by Fig. 9. The seeder shaft section 82 has in addition to the holes 86, 94, 166 and 167 an auxiliary hole 173 which is spaced about one inch to the left from the hole 94. In order to adjust the planter units to a maximum transverse spacing from each other, the bevel pinion 83 is secured to the seeder shaft section 82 by inserting the cotter pin 84 into the hole 164, and the bevel pinion 88 is secured to the seeder shaft section 87 by inserting the cotter pin 89 into the hole 172. Moreover, the seeder shaft section 82 is adjusted outwardly toward the right relative to the coupling shaft section 92 as shown in Fig. 9, and the cotter pin 93 is inserted through the auxiliary hole 173, so as to secure the seeder shaft section 82 and the coupling shaft section 92 in nonrotatable, axially fixed relation to each other. The positioning collars 98 and 101 (in Fig. 8) are secured on the seeder shaft sections 82 and 87 in close proximity to the side walls 64 and 79 so as to limit axial back and forth movement of the entire seeder shaft assembly 82, 87 and 92 relative to the tool bar 32.

In the condition of the parts as shown in Fig. 9, the overall length of the entire seeder shaft assembly is somewhat greater than the overall length of the seeder shaft assembly as shown in Fig. 8. Such increased length of the seeder shaft assembly will be due to the axial outward adjustment of the seeder shaft section 82 relative to the coupling shaft section 92. Preparatory to adjustment of the parts into the condition in which they are shown in Fig. 9 the clamping bolts 107 and 108 for the support 104 (Fig. 2) may be loosened, so that when seeder shaft section 82, together with the bracket arm 103 are moved to the right, the support 104 may slide a corresponding distance to the right on the tool bar 32. The cooperative relationship between the throwout clutch 112 and the clutch control lever 136 will therefore not be disturbed by the slight axial outward adjustment of the seeder shaft section 82.

Figs. 6 and 7 show a two-row tractor planter which is similar to the tractor planter shown in Figs. 1 and 2 in that it comprises the same tractor component, generally indicated by the reference character 1, and an implement component including the draft bars 28 and 29 and the transverse tool bar 32 which have been described hereinbefore. The lift mechanism for raising and lowering the implement component of the tractor planter shown in Figs. 6 and 7 is the same as that shown in Figs. 1 and 2, and comprises the hereinbefore described rock shaft 36, lift levers 37 and 38 and lift bail 43.

Right and left planter units, generally indicated in Fig. 6 by the reference characters 174 and 176, are mounted on the tool bar 32 in transversely spaced relation to each other and are adapted for selective adjustment longitudinally of the tool bar. The right planter unit 174 is associated with a lister unit comprising a tool standard 177 (Fig. 7) and a lister bottom 178 which is secured to the lower end of the tool standard 177 in conventional manner. A hopper attaching structure of the planter unit 174 comprises a bracket plate 179 (Fig. 6) in overlying relation to the upper part of the tool standard 177, the plate 179 being rigidly secured to the standard 177, as by welding. A pair of U-bolts 181 and 182 are looped around the tool bar 32 from below and extend upwardly through the bracket plate 179. Nuts 183 on the upper ends of the U-bolts 181, 182 are drawn up to releasably secure the plate 179 and associated parts in nonrotatably and axially fixed relation to the tool bar 32.

Rigidly secured to the bracket plate 179 and extending rearwardly therefrom is a hopper mounting base 184 which comprises a pair of transversely spaced side walls 186, 187 (Fig. 6) and a connecting wall 188. An elongated seeder shaft section 189 is disposed in generally parallel relation to the tool bar 32 and is supported for selective longitudinal adjustment relative to the hopper mounting base 184 and for movement therewith relative to the tool bar 32. The seeder shaft section 189 is journaled in shaft receiving openings 191 and 192 (Fig. 10) of the wall portions 186 and 187, respectively. A bevel pinion 193 is nonrotatably secured to the seeder shaft section 189 between the wall portions 186 and 187 by means of a cotter pin 194 (Fig. 6) which extends through a hole 196 (Fig. 10) in the seeder shaft section 189.

Referring to Fig. 7, a seed hopper 197 is mounted, in a known manner, on the base 184, and a conventional seed feeding mechanism, not shown, is mounted at the bottom of the hopper 197. The seed feeding mechanism of the right planter unit is driven by a hopper drive shaft 195 having a bevel pinion 198 (Fig. 7) in mesh with and driven by the bevel pinion 193 mounted on seeder shaft section 189 (Fig. 6). A seed delivery tube 199 is suitably suspended in conventional manner at the bottom of the hopper 197 and terminates at its lower end in rear of the lister bottom 178 for depositing seed in the furrow which is formed by the lister bottom 178. Also mounted on the tool standard 177 is a conventional ground rig comprising an opener 201 and covering disks 202 and 203 operatively mounted on a transverse cross bar 205 secured to rearwardly extending frame member 200. Conventional press wheels, not shown, may be mounted on the tool standard 177 in trailing relation to opener 201 and covering disks 202, 203.

The foregoing explanations with respect to the right planter unit 174 similarly apply to the left planter unit 176 which is shown in the upper part of Fig. 6. The left planter unit is associated with a lister bottom 204 which is a duplicate of the lister 178 and mounted on the tool bar 32 for adjustment longitudinally thereof in the same manner as has been explained hereinbefore in connection with the lister bottom 178. A bracket plate 206 corresponding to the bracket plate 179 is secured to the upper end of the tool standard (not shown) for the lister bottom 204, and a pair of U-bolts 207 and 208 with nuts 209, corresponding to U-bolts 181 and 182 and nuts 183, are provided to secure the bracket plate 206 and its associated beam and lister bottom 204 in nonrotatable and longitudinally adjustable relation to the tool bar 32. A hopper mounting base 211 corresponding to the hopper mounting base 184 is secured to and extends rearwardly from the bracket plate 206 and comprises transversely spaced wall portions 212 and 213, as indicated in Figs. 6 and 10. A seeder shaft section 214 is disposed in axial alignment with the seeder shaft section 189 and is supported for adjustment longitudinally of the tool bar 32 in unison with the hopper mounting base 211. As shown in Fig. 10, the wall portions 212 and 213 of the hopper mounting base 211 have shaft receiving openings 216 and 217, respectively, and the seeder shaft section 214 extends through and is journaled in said openings. A bevel pinion 218 corresponding to the bevel pinion 193 of the right planter unit is nonrotatably secured to the seeder shaft section 214 by a cotter pin 219 (Fig. 6) which passes through a hole 221 (Fig. 10) in the seeder shaft section 214.

The tubular coupling shaft section 92, shown in Figs. 6 and 10, is the same as the coupling shaft section 92 shown in Figs. 1, 8 and 9, and serves to connect the seeder shaft sections 189 and 214 in axially adjustable, power transmitting relation with each other. In the condition of the parts as shown in Figs. 6 and 10, a cotter pin 223 (Fig. 6) passes through a hole 224 (Fig. 10) near the left end of the seeder shaft section 189 and through a registering pair of holes at the right end of the tubular coupling shaft section 92. Another cotter pin 226 (Fig. 6) passes through a hole 227 (Fig. 10) in the seeder shaft section 214 and through a registering pair of holes at the left end of the coupling shaft section 92.

The seeder shaft section 189 is additionally supported at its axially outer end on the tool bar 32 in the same manner in which the seeder shaft section 82 of the planter in Figs. 1 and 2 is supported at the axially outer side of the throwout clutch 112. To that end, the entire assembly comprising the bracket 103, support 104, plate 106 and clamping bolts 107, 108, which is shown in Figs. 1 and 2, is incorporated in the planter as shown in Figs. 6 and 7, but it will be noted that in Fig. 6 the support 104 and its associated parts are positioned on the tool bar 32 at a greater transverse spacing from the right side of the tractor body than in Fig. 1.

In the planter as shown in Figs. 6 and 7, the seeder shaft section 189 also serves as a support for and is operatively connected with the throwout clutch 112 and gear cluster 113 which have been described hereinbefore in connection with Figs. 1, 2 and 8. However, the entire assembly comprising the throwout clutch 112, tube 143 and associated parts including the gear cluster 113, is shown in Figs. 6 and 10 in an axially outward adjusted position, as compared with the axially inward adjusted position in which the same assembly is shown in Figs. 1, 8 and 9. In the condition of the parts as shown in Figs. 6 and 10, the driven section 121 of the clutch 112 is nonrotatably secured in axially fixed position to the seeder shaft section 189 by a cotter pin 228 (Fig. 6) which passes through a hole 229 (Fig. 10) in the seeder shaft section 189 and through a registering pair of holes in a hub sleeve of the clutch section 121. In order to secure the driving section 119 of the clutch together with the tube 143 against axial inward displacement, that is to the left, from the position in which these parts are shown in Figs. 6 and 10, a cotter pin 231 (Fig. 6) is installed in a hole 232 (Fig. 10) of the seeder shaft section 189 at the axially inner end of and in abuttable relation to the tube 143. Another cotter pin 233 (Fig. 6) is installed in a hole 257 (Fig. 10) of the seeder shaft section 189 at the axially outer side of the bracket arm 103 in which the seeder shaft section 189 is journaled at its axially outer end.

The explanations hereinbefore in connection with Figs. 1 and 2, regarding automatic engagement and disengagement of the clutch 112 upon lowering and raising, respectively, of the tool bar 32 similarly apply to the planter shown in Figs. 6 and 7. The clutch control lever 136, journal sleeve 137, chain 138, spring 139 shown in Figs. 6 and 7 are the same as the corresponding parts shown in Figs. 1 and 2, except that the effective length of the chain 138 in Fig. 6 is somewhat greater than in Fig. 1. The planter drive sprocket 152, the drive chain 159, the chain tensioning rollers 161, 162, arm 163 and spring 165 shown in Figs. 6 and 7 are the same as the corresponding parts shown in Figs. 1 and 2. However, the right traction wheel 12 and the corresponding left traction wheel 12' as shown in Fig. 6 are adjusted to their minimum tread positions, and the drive sprocket 152 is mounted at the axially outer side of the right traction wheel 12.

As shown in Fig. 11, the disk 14 of the wheel 12 is secured to the flange 13 of the driving axle in a position in which the convex side of the disk faces outwardly relative to the body structure of the tractor. The mounting of the stud bolts 16 on the axle flange 13 as shown in Figs. 6 and 11 is the same as explained hereinbefore in connection with Figs. 4 and 14. The planter drive sprocket 152 may readily be removed from the axially inner side of the wheel prior to reversal of the disk 14 from the position in which it is shown in Fig. 4 to the position in which it is shown in Fig. 11. After the disk 14 has been reversed and the socket studs 16 have been reinstalled as shown in Fig. 11, the planter drive sprocket may be secured at the axially outer side, which is now the convex side of the disk, as shown in Fig. 11. For that purpose, the cap screws 236 of substantial length are threaded into the tapped recesses 18 of the stud bolts 16, with the shanks of the cap screws 236 extending through the same holes of the sprocket 152 through which the threaded shanks 17 of the socket studs 16 extend when the drive sprocket is mounted at the axially inner side of the disk 14 as shown in Fig. 4. Long tubular spacers 237 surround the shanks of the cap screws 236 between the socket studs 16 and the mounting flange section 157 of the drive sprocket 152.

In operation of the tractor planter illustrated in Figs. 6 and 7, the lister bottoms 178 and 204 throw up loose soil in back of and laterally beyond the traction wheels 12 and 12', respectively. When the tractor arrives at one end of the field and is turned around, say to the right, the lister bottoms will form a new pair of furrows during the return trip, and the center of the new furrow which is formed during the return trip by the lister bottom 178 will be spaced from the center of the furrow which has previously been formed by the same lister bottom, a distance equal to the center distance at which the lister bottoms are shown from each other in Fig. 6. Due to the narrow tread spacing of the traction wheels as shown in Fig. 6, the loose soil which has been thrown toward the right of the tractor by the lister bottom 178 during travel toward the mentioned one end of the field will not be packed down by the right tractor wheel during the mentioned return trip toward the other end of the field.

The planter shown in Figs. 6 and 7 may be adjusted for planting at row spacings which are wider or narrower than the row spacing which is afforded by the relative transverse spacing at which the planter units 174 and 176 are shown in Fig. 6. Referring to Fig. 10, the right seeder shaft section 189 has two holes 238 and 239 to the left of hole 196; one hole 241 to the right of hole 196; and one auxiliary hole 242 to the left of hole 224. The left seeder shaft section 214 has two holes 243 and 244 to the right of hole 227, and two holes 246 and 247 to the left of hole 227. In order to reduce the relative transverse spacing between the planter units 174, 176, the nuts 183 on the U-bolts 181 and 182, and the nuts 209 on the U-bolts 207 and 208 are loosened, and the cotter pin 194 at the right planter unit 174, and the cotter pin 226 at the left end of coupling shaft section 92 are removed. The cotter pin 219 at the left planter unit 176, the cotter pin 223 at the right end of coupling shaft section 92, the cotter pins 231, 228 and 233 at the clutch and gear cluster assembly may stay in place. A first reduced spacing of the planter units may be determined by securing the left end of coupling shaft section 92 at the hole 246, and the bevel pinion 193 at the hole 238; and a second still further reduced spacing of the planter units may be determined by securing the left end of coupling shaft section 92 at the hole 247 and the bevel pinion 193 at the hole 239.

A first increased relative spacing of the planter units 174 and 176 may be determined by securing the left end of the coupling shaft section 92 at the hole 243 and the bevel pinion 193 at the hole 241. A second, still further increased relative spacing of the planter units 174, 176 may be determined by securing the left end of the coupling shaft section 92 at the hole 244, by securing the right end of the coupling shaft section 92 at the hole 242 and by securing the bevel pinion 193 at the hole 241.

In the last mentioned condition, that is, when the planter units are adjusted to their maximum relative spacing, the overall length of the seeder shaft assembly comprising the interconnected shaft sections 92, 189 and 214 is somewhat increased due to the axial outward displacement of the seeder shaft section 189 relative to the coupling shaft section 92 at the right end of the latter. Such increase of the overall length of the seeder shaft assembly may be taken care of by laterally outward adjustment of the bracket 104 and its associated parts on the tool bar 32, as has been explained hereinbefore with reference to Figs. 1 and 2. After any one of the various possible spacings of the planter units 174 and 176 has been determined in the manner outlined hereinbefore and the planter units have been adjusted longitudinally of the tool bar 32 to such positions that each will be spaced the same transverse distance from a vertical plane extending longitudinally of the tractor midway between the traction wheels 12 and 12', the nuts on the U-bolts 182, 181 and 207, 208 are tightened so as to secure the planter units on the tool bar 32 against displacement longitudinally of the latter from their adjusted positions.

The speed ratio between the planter drive sprocket 152 and the seeder shaft assembly in Figs. 6 and 7 may be varied in the same manner as has been explained hereinbefore with reference to Figs. 1 and 2, that is, by axial adjustment of the gear cluster 113 on the tube 143 so as to radially align any selected gear section on the cluster 113 with the toothed section of the drive sprocket 152.

The tractor planter as shown in Figs. 1 and 2, lends itself for planting on the ridges of previously listed land or on flat land, as has been pointed out hereinbefore, and the tractor planter as shown in Figs. 6 and 7 is adapted for listing and planting in one operation. From the explanations hereinbefore it will be apparent that the tractor planter shown in Figs. 1 and 2 may readily be converted, if desired, for lister planting, that is, for combined listing and planting in one operation; and that the lister planter as shown in Figs. 6 and 7 may readily be converted for ridge planting on previously listed land or for flat land planting.

In order to convert the planter shown in Figs. 1 and 2 to lister planting, the planter drive chain 159 is preferably opened up and removed. Next, the planter drive sprocket 152 is removed from the axially inner side of the traction wheel 12, and both traction wheels are adjusted to a desirably narrow tread spacing, which may be the minimum tread spacing shown in Figs. 6 and 11 or possibly the tread spacing which is illustrated by Fig. 12. It should be understood that the tire and rim assembly of the traction wheel 12 can be shifted from the position shown in Fig. 4 to the position shown in Fig. 12 by power, and that it is not necessary in order to effect such a shift, to jack up the tractor as it must be when the disk 14 is to be reversed from the position shown in Fig. 4 to the position shown in Fig. 11. If the traction wheels are to be operated in the condition illustrated by Fig. 12, cap screws 248 and spacers 249 of greater lengths than the cap screws 236 and spacers 237 in Fig. 11 will be used in order to secure the planter drive sprocket 152 at the axially outer side of the traction wheel 12, as shown in Fig. 12.

In order to drive the seeder shaft assembly of the tractor shown in Figs. 1 and 2 when the planter drive sprocket 152 is located at the axially outer side of the traction wheel 12 either as shown in Fig. 11 or in Fig. 12, the entire clutch and gear cluster assembly comprising the clutch 112, tube 143 and associated parts including the sprocket gear sections 114, 116, 117 and 118, is shifted axially outward on the seeder shaft section 82 to a position corresponding to that in which the same clutch and gear cluster assembly is shown in Figs. 6 and 10. The support 104 and parts associated therewith including the clutch control lever 136 and the chain tensioning rollers 161, 162, are likewise moved laterally outward on the tool bar 32 to the position in which these parts are shown in Fig. 6.

Referring to Fig. 8, the seeder shaft section 82 has a hole 251 at which the driven section 121 of the clutch 112 is secured in the outwardly shifted position of the latter by means of the cotter pin 122 (Fig. 1), and additional holes 252 and 253 (Fig. 8) are formed in the seeder shaft section 82 which receive the cotter pins 109 and 144 (Fig. 1), respectively, after the clutch and gear cluster assembly of the planter shown in Figs. 1 and 2 has been adjusted to its axially outward position. Lister bottoms and corresponding ground rigs such as shown in Figs. 6 and 7 may be used in lieu of the ground rigs shown in Figs. 1 and 2.

In order to convert the lister planter shown in Figs. 6 and 7 into a planter for use on previously listed land or on flat land, the planter drive sprocket 152 and chain 159 may be removed from the axially outer side of the traction wheel 12 and reinstalled at the axially inner side of the wheel 12 after the wheels 12 and 12′ have been adjusted to an increased tread spacing which for purposes of explanation may be assumed to be the maximum tread spacing illustrated by Fig. 4. Under certain conditions the tread spacing and drive sprocket mounting illustrated by Fig. 12 may be used for planting on the ridges of previously listed land or on flat land which has previously been plowed and harrowed.

When the position of the drive sprocket 152 is changed from the axially outer to the axially inner side of the traction wheel 12 in converting the planter shown in Figs. 6 and 7, the entire clutch and gear cluster assembly comprising the clutch 112 and tube 143 with associated parts is shifted axially inward on the seeder shaft section 189 to a position corresponding to that in which the same clutch and gear cluster assembly is shown in Figs. 1 and 8. The support 104 and parts associated therewith including the clutch control lever 136 and the chain tensioning rollers 161, 162 are likewise moved laterally inward on the tool bar 32 to the position in which these parts are shown in Fig. 1.

The seeder shaft section 189 has a hole 254 (Fig. 10) at which the driven section 121 of the clutch 112 is secured in the inwardly shifted position of the latter by means of the cotter pin 228 (Fig. 6), and additional holes 256 and 234 (Fig. 10) are formed in the seeder shaft section 189 which receive the cotter pins 231 and 233 (Fig. 6), respectively, after the clutch and gear cluster assembly of the planter shown in Figs. 6 and 10 has been adjusted to its axially inward position. Ground rigs such as shown in Figs. 1 and 2 may be used in lieu of the lister bottoms and ground rigs shown in Figs. 6 and 7 for the purpose of converting the planter shown in the latter Figs. to use for planting on the ridges of previously listed land or on previously plowed and harrowed flat land.

The planter illustrated in Figs. 1 and 2, and the planter illustrated in Figs. 6 and 7 each incorporate a rotatable seeder shaft (82 in Fig. 1, and 189 in Fig. 6); a driving clutch member 119 rotatably mounted on said seeder shaft in axially adjustable relation to the latter; means, which in Figs. 1 and 8, include the cotter pin 144 and holes 146, 253; and in Figs. 6 and 10 the cotter pin 231 and holes 232, 256, operable to selectively determine first (Fig. 1) and second (Fig. 6), relatively spaced, axial positions of said driving clutch member relative to said seeder shaft; a driven clutch member 121; means which in Figs. 1 and 8 include the cotter pin 122 and the holes 123, 251, and in Figs. 6 and 10 the cotter pin 228 and holes 229 and 254, operable to selectively determine first (Fig. 1) and second (Fig. 6) relatively spaced, axial positions of said driven clutch member relative to said seeder shaft and to nonrotatably secure said driven clutch member in each of said first (Fig. 1) and second (Fig. 2) positions thereof to said seeder shaft; control means including the rocket 124 (Fig. 5) and lever 136 (Fig. 2) selectively operable to establish and interrupt a driving connection between said driving and driven clutch members 119, 121 while the latter are in said first positions, respectively, as shown in Fig. 1, and also while said driving and driven clutch members are in said second positions, respectively, as shown in Fig. 6; and a power transmitting gear element as represented, for instance, by any one of the driven sprocket sections 114, 116, 117, 118, operatively connected with said driving clutch element 119 for movement therewith axially of said seeder shaft.

It should be understood that it is not intended to limit the invention to the particular forms and details described hereinabove and that the invention includes such other forms and modifications as are embraced by the scope of the appended claims.

It is claimed and desired to secure by Letters Patent:

1. In combination with a tractor mounting a transversely disposed tool bar for vertical movement relative thereto and having means operatively connected with said tool bar for adjusting the vertical position of the latter, a pair of structures, each including a hopper base and a supporting bracket, releasably fixed on said tool bar in spaced laterally aligned relation for selective independent adjustment longitudinally of said bar, a first rotatable seeder shaft section operatively mounted on one of said structures for selective axial adjustment relative thereto with the axis of said first section disposed in generally parallel relation to said tool bar, a second rotatable seeder shaft section operatively mounted on the other one of said structures for selective axial adjustment relative thereto with the axis of said second section in alignment with the axis of said first section, a coupling shaft section connecting said seeder shaft sections in axially adjustable power transmitting relation with each other to form a shaft assembly which is selectively variable as to overall length, a clutch and a clutch driven sprocket operatively mounted on an outer end portion of one of said seeder shaft sections, and a clutch throwout means mounted on said tool bar, said clutch throwout means, said clutch and said driven sprocket being adjustable as a unit longitudinally of said tool bar to maintain said clutch throwout means in operative alignment with said clutch.

2. In a self-propelled agricultural machine, the combination of a tractor body, a traction wheel at one side of said tractor body selectively adjustable to wide and narrow tread positions, a drive sprocket, said traction wheel having an axially inner side and an axially outer side presenting portions for coaxially positioning said drive sprocket on a selected one of said sides, releasable fastening means operatively mounting said drive sprocket on the selected one of said sides of said wheel for rotation with said wheel, a tool bar mounted on said tractor body in transversely extending relation thereto and being spaced from said traction wheel in the direction of travel, a pair of structures each comprising a supporting bracket on which is mounted a hopper base provided with a rotatable seed dispensing mechanism, releasable fastening means operatively fixing said structures on said tool bar in selectively spaced laterally aligned relation with one of said structures disposed adjacent said one side of said tractor body, seed dispensing mechanisms including a first shaft section mounted on said one structure in axially adjustable relation thereto and for rotation on an axis extending generally parallel to said tool bar, said first shaft section extending laterally outward from its mounting structure to present an end portion in approximate fore and aft alignment with said traction wheel, a second shaft section rotably mounted on said other structure in axially adjustable relation thereto with its axis in alignment with the axis of said first shaft section, a coupling shaft section connecting said first and second shaft sections in axially adjustable power transmitting relation whereby the combined length of said shaft sections may be selectively varied by the axial adjustment of at least one of said first and second shaft sections, and power transmitting means operatively mounted on said end portion of said first shaft section in a position in alignment with said drive sprocket positioned on said selected one of said sides of said wheel, said power transmitting means being selectively adjustable longitudinally of said first shaft section to another position in alignment with said drive sprocket when positioned on the other one of said sides of said wheel.

3. A self-propelled agricultural machine comprising the combination of elements set forth in claim 2 and in which the power transmitting means comprises a clutch and a driven cluster of axially adjacent sprockets of different diameter operatively mounted on said end portion of said first shaft section with a selected sprocket of said cluster aligned with said drive sprocket on said one side of said wheel, and a clutch throwout means axially adjustably mounted on said tool bar in operative engagement with said clutch, and said clutch, driven sprocket cluster and throwout means being shiftable as a unit longitudinally of said first shaft section and of said tool bar to align said selected sprocket of said cluster with said drive sprocket when positioned on said other side of said wheel and to maintain said clutch throwout means in operative alignment with said clutch, and a flexible power transmitting means directly connecting said drive sprocket with said selected sprocket.

4. A self-propelled agricultural machine comprising the combination of elements set forth in claim 3 and in which said tractor includes an axle structure operatively mounting said traction wheel, said traction wheel having a radially inner part having opposite sides and reversibly and coaxially attached at one side of said tractor for rotation with said axle structure, said drive sprocket selectively secured on one of the sides of said radially inner wheel part, and said traction wheel having a radially outer part adjustable axially relative to said inner wheel part to provide said wide and narrow tread positions; said tool bar being disposed for vertical movement relative to said tractor which has means operatively connected with said tool bar for adjusting the vertical position of said tool bar; and additional means secured to a fixed portion of said tractor and operatively connected with said clutch throwout means to move the latter into and out of clutch disengaging position in response to upward and downward movements, respectively, of said tool bar relative to said tractor.

5. In a self-propelled agricultural machine, the combination of a tractor having a power driven axle structure operatively mounting a rear traction wheel including a radially inner part reversibly and coaxially fixed to a rotating part of said axle structure, said traction wheel also including a radially outer wheel part shiftable coaxially relative to said radially inner wheel part, a tool bar movable vertically relative to said tractor and mounted thereon in transversely extending relation and spaced from said traction wheel in the direction of travel, means releasably mounted on said tool bar operatively supporting a shaft for rotation and limited axial adjustment in parallel relation to said tool bar; power transmitting means comprising a drive sprocket, a driven sprocket and a flexible power transmitting element directly connecting said drive sprocket with said driven sprocket, releasable means mounting said drive sprocket on one side of said radially inner part for rotation with said wheel, said driven sprocket and a clutch mounted in a first position on an end portion of said shaft for rotation therewith, a clutch throwout means mounted in a first position on said tool bar in operative alignment with said clutch, said driven sprocket in said first position being aligned with the drive sprocket positioned on said one side of said inner wheel part, said releasable means providing remounting of said drive sprocket on the other side of said inner wheel part in offset relation to said outer wheel part upon axially shifting said outer wheel part from said drive sprocket toward said inner wheel part, and said driven sprocket, clutch, and clutch throwout means movable as a unit longitudinally of said shaft and tool bar to a second position bringing said driven sprocket into alignment with said drive sprocket positioned on said other side of said inner wheel part.

6. In a tractor having a power driven axle structure operatively mounting a rear traction wheel including a radially inner part and a radially outer part selectively shiftable coaxially relative to said radially inner part to a first operating position providing relatively wide tread spacing and to a second operating position providing relatively narrow tread spacing, said radially inner part reversibly and coaxially fixed to a rotating part of said axle structure to present one side of said radially inner wheel part facing the body structure of said tractor for said first operating position and reversibly mounted to present the other side of said inner wheel part facing the body structure of said tractor for said second operating position, and a drive sprocket operatively associated with said inner wheel part and axle structure to project axially away from said one side of said radially inner wheel part for both said operating positions.

7. A tractor as set forth in claim 6 and further having power transmitting means including a driven sprocket spaced from said axle structure and mounted for adjustment transversely of said tractor into radial alignment with said drive sprocket.

8. A tractor as set forth in claim 7 and further having a flexible power transmitting element in direct cooperative engagement with said drive and driven sprockets.

9. In combination with a tractor mounting a transversely disposed tool bar for vertical movement relative thereto and having means operatively connected with said tool bar for adjusting the vertical position of the latter, a pair of structures, each including a hopper base and a supporting bracket, releasably fixed on said tool bar in spaced laterally aligned relation for selective independent adjustment longitudinally of said bar, a first rotatable seeder shaft section operatively mounted on one of said structures for selective axial adjustment relative thereto with the axis of said first section disposed in generally parallel relation to said tool bar, a second rotatable seeder shaft section operatively mounted on the other one of said structures for selective axial adjustment relative thereto with the axis of said second section in alignment with the axis of said first section, a coupling shaft section connecting said seeder shaft sections in axially adjustable power transmitting relation with each other to form a shaft assembly which is selectively variable as to overall length, and power transmitting means operatively mounted on an outer end portion of one of said seeder shaft sections for selective adjustment longitudinally thereof.

10. A tractor planter comprising the combination of elements as set forth in claim 9 and in which said coupling shaft section comprises a tubular element in variable telescopic engagement at its opposite ends with said seeder shaft sections, respectively; and separate detachable fastening means operatively fixing said telescopically engaged portions of said tubular element and seeder shaft sections for rotation in unison with each other in different selected positions of relative axial adjustment.

11. In combination with a tractor mounting a transversely disposed tool bar for vertical movement relative thereto and having means operatively connected with said tool bar for adjusting the vertical position of the latter, a pair of structures, each including a hopper base and a supporting bracket, releasably fixed on said tool bar in spaced laterally aligned relation for selective independent adjustment longitudinally of said bar, said structures each presenting a pair of laterally spaced portions having shaft receiving openings therethrough with the openings in one structure aligned with the openings in the other structure on an axis extending generally parallel to said tool bar, an elongated seeder shaft section extending through said openings in one of said pairs of laterally spaced portions and being journaled therein, another seeder shaft section extending through said openings in the other pair of laterally spaced portions and being journaled therein, means affording longitudinal adjustment of each seeder shaft section relative to the structure supporting same, a tubular coupling shaft section connecting said seeder shaft sections in telescopically adjustable power transmitting relation with each other to form a shaft assembly which is selectively variable as to overall length, and a driven sprocket operatively mounted on an outer portion of said elongated seeder shaft section for selective adjustment longitudinally thereof.

12. In combination with a tractor mounting a transversely disposed tool bar for vertical movement relative thereto and having means operatively connected to said tool bar for adjusting the vertical position of the latter, a pair of brackets releasably fixed on said tool bar in spaced laterally aligned relation for selective independent adjustment longitudinally of said bar, said brackets each mounting a hopper base structure presenting a pair of laterally spaced portions having shaft receiving openings therethrough aligned on an axis extending generally parallel to said tool bar, an elongated seeder shaft section extending through said openings of one of said base structures and being journaled therein, a positioning collar adjustably fixed on said elongated seeder shaft section in axial engagement with one of said laterally spaced portions of said one base structure, another seeder shaft section extending through said openings of the other base structure and being journaled therein, another positioning collar adjustably fixed on said other seeder shaft section in axial engagement with one of said laterally spaced portions of said other base portion, said collars affording longitudinal adjustment of said seeder shaft sections relative to their respective base structures, a coupling shaft section connecting said seeder shaft sections in axially adjustable power transmitting relation with each other to form a shaft assembly which is selectively variable as to overall length, and a driven sprocket operatively mounted on an outer end portion of said elongated seeder shaft section for selective adjustment longitudinally thereof.

References Cited in the file of this patent

UNITED STATES PATENTS

| Number | Name | Date |
|---|---|---|
| 285,213 | Benson | Sept. 18, 1883 |
| 1,308,163 | Burgess | July 1, 1919 |
| 1,535,419 | Jarfas | Apr. 28, 1925 |
| 1,609,630 | Newton | Dec. 7, 1926 |
| 1,876,485 | Bormann | Sept. 6, 1932 |
| 2,002,179 | Hitchcock | May 21, 1935 |
| 2,034,919 | Olson | Mar. 24, 1936 |
| 2,144,347 | Silver | Jan. 17, 1939 |
| 2,171,031 | Graham et al. | Aug. 29, 1939 |
| 2,328,174 | Silver | Aug. 31, 1943 |
| 2,339,689 | Englund | Jan. 19, 1944 |
| 2,360,028 | White | Oct. 10, 1944 |
| 2,361,100 | Hipple | Oct. 24, 1944 |
| 2,407,955 | Halliday et al. | Sept. 17, 1946 |
| 2,656,801 | Hansen et al. | Oct. 27, 1953 |